United States Patent
Park et al.

(10) Patent No.: US 10,531,370 B2
(45) Date of Patent: Jan. 7, 2020

(54) METHOD AND APPARATUS FOR TRANSMITTING DATA IN WIRELESS COMMUNICATION SYSTEM

(71) Applicant: LG ELECTRONICS INC., Seoul (KR)

(72) Inventors: Hyunhee Park, Seoul (KR); Dongcheol Kim, Seoul (KR); Byungjoo Lee, Seoul (KR); Giwon Park, Seoul (KR); Taesung Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 141 days.

(21) Appl. No.: 15/553,104

(22) PCT Filed: Feb. 24, 2016

(86) PCT No.: PCT/KR2016/001796
§ 371 (c)(1),
(2) Date: Aug. 23, 2017

(87) PCT Pub. No.: WO2016/137224
PCT Pub. Date: Sep. 1, 2016

(65) Prior Publication Data
US 2018/0041946 A1    Feb. 8, 2018

Related U.S. Application Data

(60) Provisional application No. 62/120,301, filed on Feb. 24, 2015, provisional application No. 62/138,941, (Continued)

(51) Int. Cl.
*H04W 48/16* (2009.01)
*H04W 76/10* (2018.01)
(Continued)

(52) U.S. Cl.
CPC ............ *H04W 48/16* (2013.01); *H04L 9/08* (2013.01); *H04L 9/088* (2013.01); *H04L 9/0861* (2013.01);
(Continued)

(58) Field of Classification Search
CPC ... H04L 67/16; H04L 67/104; H04L 61/2015; H04L 63/08; H04L 63/061; H04L 9/3271;
(Continued)

(56) References Cited

U.S. PATENT DOCUMENTS 9,781,586 B2 * 10/2017 Jung .................. H04W 8/005
2006/0129814 A1 * 6/2006 Eun ..................... H04L 63/08
713/168
(Continued)

FOREIGN PATENT DOCUMENTS

CN    104717279 A  *  6/2015
CN    104105194 B  *  8/2017
(Continued)

OTHER PUBLICATIONS

Kim: "LB204-Comment resolution on some CIDs for 10.1.4.3.8", IEEE 802.11-10/1241r63, IEEE P802.11 TGAI, Nov. 5, 2014, pp. 3 and 8.
(Continued)

*Primary Examiner* — Jeffrey C Pwu
*Assistant Examiner* — Ali H. Cheema
(74) *Attorney, Agent, or Firm* — Dentons US LLP

(57) ABSTRACT

The present specification relates to a method for transmitting data by a first neighbor awareness networking (NAN) device in a wireless communication system. The method for transmitting data may comprise the steps of: performing a service discovery for a first service with a second NAN device through a service discovery frame (SDF); and exchanging data for the first service with the second NAN device on the
(Continued)

basis of the performed service discovery. Here, when at least one of authentication and association is required in transmitting the data for the first service, attribute information which is required for the data transmission among information on authentication attributes and information on association attributes may be included in the service discovery frame.

15 Claims, 12 Drawing Sheets

Related U.S. Application Data filed on Mar. 26, 2015, provisional application No. 62/148,199, filed on Apr. 16, 2015.

(51) Int. Cl.
| | |
|---|---|
| H04W 8/00 | (2009.01) |
| H04W 12/06 | (2009.01) |
| H04W 76/14 | (2018.01) |
| H04L 9/08 | (2006.01) |
| H04L 9/32 | (2006.01) |
| H04L 29/06 | (2006.01) |
| H04W 72/04 | (2009.01) |
| H04W 84/18 | (2009.01) |
| H04L 29/08 | (2006.01) |
| H04W 12/04 | (2009.01) |
| H04W 84/12 | (2009.01) |

(52) U.S. Cl.
CPC .......... *H04L 9/3236* (2013.01); *H04L 9/3271* (2013.01); *H04L 63/061* (2013.01); *H04L 63/08* (2013.01); *H04L 67/1061* (2013.01); *H04L 67/16* (2013.01); *H04W 8/00* (2013.01); *H04W 12/04* (2013.01); *H04W 12/06* (2013.01); *H04W 72/0446* (2013.01); *H04W 76/10* (2018.02); *H04W 76/14* (2018.02); *H04W 84/18* (2013.01); *H04L 2209/80* (2013.01); *H04L 2463/062* (2013.01); *H04W 8/005* (2013.01); *H04W 84/12* (2013.01)

(58) Field of Classification Search
CPC ... H04L 9/088; H04L 9/0861; H04L 67/1061; H04L 9/08; H04L 9/3236; H04L 2463/062; H04L 2209/80; H04W 48/14; H04W 48/10; H04W 8/005; H04W 52/02; H04W 12/06; H04W 92/10; H04W 48/16; H04W 12/04; H04W 84/18; H04W 76/14; H04W 72/0446; H04W 76/10; H04W 8/00; H04W 84/12; G06F 21/6245

USPC .......... 713/168; 711/164; 709/220; 708/200; 455/509; 380/270; 370/388, 311, 329, 370/254
See application file for complete search history.

(56) References Cited

U.S. PATENT DOCUMENTS

| | | | |
|---|---|---|---|
| 2006/0161750 A1* | 7/2006 | Perkins | G06F 21/6245 711/164 |
| 2008/0126455 A1* | 5/2008 | Francfort | H04L 63/08 708/200 |
| 2009/0296672 A1* | 12/2009 | Beach | H04W 92/10 370/338 |
| 2014/0141826 A1* | 5/2014 | Cordeiro | H04W 48/14 455/509 |
| 2014/0254426 A1* | 9/2014 | Abraham | H04W 48/10 370/254 |
| 2014/0293978 A1 | 10/2014 | Yang et al. | |
| 2015/0071443 A1* | 3/2015 | Cherian | H04W 12/06 380/270 |
| 2016/0073330 A1* | 3/2016 | Patil | H04L 61/2015 709/220 |
| 2016/0128113 A1* | 5/2016 | Qi | H04W 8/005 370/329 |
| 2016/0135122 A1* | 5/2016 | Abraham | H04W 52/02 370/311 |
| 2016/0165653 A1* | 6/2016 | Liu | H04L 67/104 370/329 |
| 2016/0226928 A1* | 8/2016 | Park | H04L 67/16 |
| 2016/0242033 A1* | 8/2016 | Jung | H04W 12/06 |
| 2016/0242056 A1* | 8/2016 | Patil | H04W 76/14 |
| 2017/0208030 A1* | 7/2017 | Qi | H04L 45/7453 |
| 2017/0257897 A1* | 9/2017 | Chen | H04W 76/14 |
| 2017/0265238 A1* | 9/2017 | Li | H04W 48/16 |
| 2017/0303292 A1* | 10/2017 | Ahn | H04W 72/12 |
| 2019/0037619 A1* | 1/2019 | Qi | H04W 8/005 |

FOREIGN PATENT DOCUMENTS

| | | |
|---|---|---|
| KR | 10-2009-0132650 A | 12/2009 |
| WO | 2014/008238 A1 | 1/2014 |
| WO | 2014/098437 A1 | 6/2014 |

OTHER PUBLICATIONS

International Search Report from PCT/KR2016/001796, dated May 30, 2016.
Written Opinion of the ISA from PCT/KR2016/001796, dated May 30, 2016.

* cited by examiner

METHOD AND APPARATUS FOR TRANSMITTING DATA IN WIRELESS COMMUNICATION SYSTEM

This application is a National Stage Application of International Application No. PCT/KR2016/001796, filed on Feb. 24, 2016, which claims the benefit of U.S. Provisional Application No. 62/120,301, filed on Feb. 24, 2015, U.S. Provisional Application No. 62/138,941, filed on Mar. 26, 2015 and U.S. Provisional Application No. 62/148,199, filed on Apr. 16, 2015, all of which are hereby incorporated by reference in their entirety for all purposes as if fully set forth herein.

TECHNICAL FIELD

The present specification relates to a wireless communication system, and more particularly, to a method of transmitting data in a wireless communication system and an apparatus therefor.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

Recently, various wireless communication technologies have been developed with the advancement of information communication technology. Among the wireless communication technologies, a wireless local area network (WLAN) is the technology capable of accessing the Internet by wireless in a home, a company or a specific service provided area through portable device such as a personal digital assistant (PDA), a laptop computer, a portable multimedia player (PMP), etc. based on a radio frequency technology.

DISCLOSURE OF THE INVENTION

Technical Tasks

A technical task of the present specification is to provide a method of transmitting data in a wireless communication system and an apparatus therefor.

Another technical task of the present specification is to provide a method of performing authentication and association when a NAN (neighbor awareness networking) device transmits data in a wireless communication system.

Another technical task of the present specification is to provide a method of omitting an unnecessary procedure by simplifying authentication and association procedures.

The other technical task of the present specification is to provide a method of performing data encryption using information on a service.

Technical Solution

To achieve these and other advantages and in accordance with the purpose of the present invention, as embodied and broadly described, according to one embodiment, a method of transmitting data, which is transmitted by a first NAN (neighbor awareness networking) device in a wireless communication system, includes the steps of performing a service discovery on a first service with a second NAN device via a service discovery frame (SDF) and exchanging data for the first service with the second NAN device based on the performed service discovery. In this case, if at least one of authentication and association is necessary for transmitting the data of the first service, attribute information necessary for transmitting the data can be included in the service discovery frame among authentication attributes and association attributes.

To further achieve these and other advantages and in accordance with the purpose of the present invention, according to a different embodiment, a first NAN (neighbor awareness networking) device transmitting data in a wireless communication system includes a reception module configured to receive information from an external device, a transmission module configured to transmit information to an external device, and a processor configured to control the reception module and the transmission module, the processor configured to perform a service discovery on a first service with a second NAN device via a service discovery frame (SDF), the processor configured to exchange data for the first service with the second NAN device based on the performed service discovery. In this case, if at least one of authentication and association is necessary for transmitting the data of the first service, attribute information necessary for transmitting the data can be included in the service discovery frame among authentication attributes and association attributes.

Following items can be commonly applied to the method of transmitting data in a wireless communication system and the NAN device.

The service discovery frame is exchanged in a discovery window and the data for the first service can be exchanged in a data path.

The attribute information necessary for transmitting the data can include information on the data path.

If at least one of the authentication and the association is necessary for transmitting the data, a frame necessary for transmitting the data among an authentication frame and an association frame can be exchanged in the data path before the data for the first service is exchanged.

The frame necessary for transmitting the data can be exchanged in a first data path only among the data path.

The first NAN device can operate in a first mode and a second mode depending on whether or not the authentication is necessary for transmitting the data. In this case, the first mode may correspond to a mode not requiring the authentication in transmitting the data of the first service, and the second mode may correspond to a mode requiring the authentication in transmitting the data of the first service and the mode requiring the exchange of the authentication frame.

If the authentication frame is exchanged, the first NAN device can transmit an authentication request frame including a first value to the second NAN device and receive an authentication response frame including a first function, which is generated based on the first value and a second value, and the second value from the second NAN device.

The authentication response frame can further include ID information on the first service.

The first NAN device generates a second function based on the first value and the second value after the authentication response frame is received and if the second function and the first function received from the authentication response frame are identical to each other, the first NAN device can transmit an authentication confirmation frame to the second NAN device.

If the authentication confirmation frame is transmitted to the second NAN device, the authentication is completed and the data for the first service can be exchanged after the authentication is completed.

The service discovery frame can further include information on a service ID of the first service. In this case, the service ID can be configured by hash data, which is generated via a first function, based on information on the first service.

The data for the first service can be exchanged with the second NAN device based on a data frame. In this case, the data frame can be encrypted using the hash data for the service ID.

The data frame can be encrypted using a partial data only of the hash data for the service ID.

If the authentication is necessary for transmitting the data of the first service, the authentication can be performed based on key distribution. In this case, the key distribution can be performed using the hash data for the service ID.

Advantageous Effects

According to the present specification, it is able to provide a method of transmitting data in a wireless communication system and an apparatus therefor.

According to the present specification, it is able to provide a method of performing authentication and association when a NAN (neighbor awareness networking) device transmits data in a wireless communication system.

According to the present specification, it is able to provide a method of omitting an unnecessary procedure by simplifying authentication and association procedures.

According to the present specification, it is able to provide a method of performing data encryption using information on a service.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

FIG. 8 is a diagram illustrating a discovery window and the like;

BEST MODE

Figure 1:
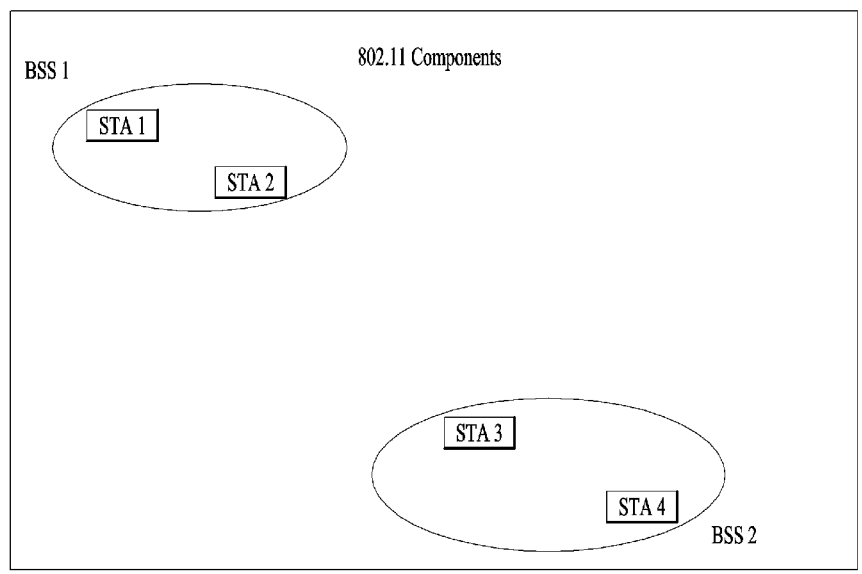
FIG. 1 is a diagram illustrating an exemplary structure of IEEE 802.11 system.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide the full understanding of the present invention. However, it will be apparent to those skilled in the art that the present invention may be implemented without such specific details.

The following embodiments can be achieved by combinations of structural elements and features of the present invention in prescribed forms. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Specific terminologies in the following description are provided to help the understanding of the present invention. And, these specific terminologies may be changed to other formats within the technical scope or spirit of the present invention.

Occasionally, to avoid obscuring the concept of the present invention, structures and/or devices known to the public may be skipped or represented as block diagrams centering on the core functions of the structures and/or devices. In addition, the same reference numbers will be used throughout the drawings to refer to the same or like parts in this specification.

The embodiments of the present invention can be supported by the disclosed standard documents disclosed for at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document can be supported by the above standard documents.

The following embodiments of the present invention can be applied to a variety of wireless access technologies, for example, CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc.

Although the terms such as "first" and/or "second" in this specification may be used to describe various elements, it is to be understood that the elements are not limited by such terms. The terms may be used to identify one element from another element. For example, a first element may be referred to as a second element, and vice versa within the range that does not depart from the scope of the present invention.

In the specification, when a part "comprises" or "includes" an element, it means that the part further comprises or includes another element unless otherwise mentioned. Also, the terms " . . . unit", " . . . module" disclosed in the specification means a unit for processing at least one function or operation, and may be implemented by hardware, software or combination of hardware and software.

For clarity, the following description focuses on IEEE 802.11 systems. However, technical features of the present invention are not limited thereto.

Structure of WLAN System

FIG. 1 is a diagram illustrating an exemplary structure of IEEE 802.11 system to which the present invention is applicable.

IEEE 802.11 structure may include a plurality of components and WLAN supportive of transparent STA mobility for an upper layer can be provided by interactions between the components. A basic service set (BSS) may correspond to a basic component block in IEEE 802.11 WLAN. FIG. 1 shows one example that two basic service sets BSS 1 and BSS 2 exist and that 2 STAs are included as members of each BSS. In particular, STA 1 and STA 2 are included in the BSS 1 and STA 3 and STA 4 are included in the BSS 2. In FIG. 1, an oval indicating the BSS can be understood as indicating a coverage area in which the STAs included in the corresponding BSS maintain communication. This area may be called a basic service area (BSA). Once the STA moves out of the BSA, it is unable to directly communicate with other STAs within the corresponding BSA.

A most basic type of BSS in IEEE 802.11 WLAN is an independent BSS (IBSS). For instance, IBSS can have a minimum configuration including 2 STAs only. Moreover, the BSS (e.g., BSS 1 or BSS 2) shown in FIG. 1, which has the simplest configuration and in which other components are omitted, may correspond to a representative example of the IBSS. Such a configuration is possible if STAs can directly communicate with each other. Moreover, the above-mentioned WLAN is not configured according to a devised plan but can be configured under the necessity of WLAN. And, this may be called an ad-hoc network.

If an STA is turned on/off or enters/escapes from a BSS area, membership of the STA in a BSS can be dynamically changed. In order to obtain the membership of the BSS, the STA can join the BSS using a synchronization procedure. In order to access all services of the BSS based structure, the STA should be associated with the BSS. This association may be dynamically configured or may include a use of a DSS (distribution system service).

Additionally, FIG. 1 shows components such as a DS (distribution system), a DSM (distribution system medium), an AP (access point) and the like.

In WLAN, a direct station-to-station distance can be restricted by PHY capability. In some cases, the restriction of the distance may be sufficient enough. However, in some cases, communication between stations located far away from each other may be necessary. In order to support extended coverage, the DS (distribution system) may be configured.

The DS means a structure in which BSSs are interconnected with each other. Specifically, the BSS may exist as an extended type of component of a network consisting of a plurality of BSSs instead of an independently existing entity as shown in FIG. 1.

The DS corresponds to a logical concept and can be specified by a characteristic of the DSM. Regarding this, IEEE 802.11 standard logically distinguishes a wireless medium (WM) from the DSM. Each of the logical media is used for a different purpose and is used as a different component. According to the definition of the IEEE 802.11 standard, the media are not limited to be identical to each other or to be different from each other. Since a plurality of the media are logically different from each other, flexibility of IEEE 802.11 WLAN structure (a DS structure or a different network structure) can be explained. In particular, the IEEE 802.11 WLAN structure can be implemented in various ways and the WLAN structure can be independently specified by a physical characteristic of each implementation case.

The DS can support a mobile device in a manner of providing seamless integration of a plurality of BSSs and logical services necessary for handling an address to a destination.

The AP enables associated STAs to access the DS through the WM and corresponds to an entity having STA functionality. Data can be transferred between the BSS and the DS through the AP. For instance, as shown in FIG. 1, while each of the STA 2 and STA 3 have STA functionality, the STA 2 and STA 3 provide functions of enabling associated STAs (STA 1 and STA 4) to access the DS. And, since all APs basically correspond to an STA, all APs correspond to an addressable entity. An address used by the AP for communication in the WM should not be identical to an address used by the AP for communication in the DSM.

Data transmitted from one of STAs associated with an AP to an STA address of the AP is always received in an uncontrolled port and the data can be processed by an IEEE 802.1X port access entity. Moreover, if a controlled port is authenticated, transmission data (or frame) can be delivered to a DS.

Layer Structure

Operations of the STA which operates in a wireless LAN system can be explained in terms of the layer structure. In terms of a device configuration, the layer structure can be implemented by a processor. The STA may have a structure of a plurality of layers. For example, a main layer structure handled in the 802.11 standard document includes a MAC sublayer and a physical (PHY) layer on a data link layer (DLL). The PHY layer may include a physical layer convergence procedure (PLCP) entity, a physical medium dependent (PMD) entity, etc. The MAC sublayer and the PHY layer conceptually include management entities called MAC sublayer management entity (MLME) and physical layer management entity (PLME), respectively. These entities provide a layer management service interface for performing a layer management function.

A station management entity (SME) is present within each STA in order to provide an accurate MAC operation. The SME is a layer-independent entity that may be considered as existing in a separate management plane or as being off to the side. Detailed functions of the SME are not specified in this document but it may be generally considered as being responsible for functions of gathering layer-dependent status from the various layer management entities (LMEs), setting values of layer-specific parameters similar to each other. The SME may perform such functions on behalf of general system management entities and may implement a standard management protocol.

The aforementioned entities interact with each other in various ways. For example, the entities may interact with each other by exchanging GET/SET primitives. The primitive means a set of elements or parameters related to a specific purpose. XX-GET.request primitive is used for requesting a value of a given MIB attribute (management information based attribute). XX-GET.confirm primitive is used for returning an appropriate MIB attribute value if a status is 'success', otherwise it is used for returning an error indication in a status field. XX-SET.request primitive is used to request that an indicated MIB attribute be set to a given value. If this MIB attribute implies a specific action, this requests that the action be performed. And, XX-SET.confirm primitive is used such that, if the status is 'success', this confirms that the indicated MIB attribute has been set to the requested value, otherwise it is used to return an error condition in the status field. If this MIB attribute implies a specific action, this confirms that the action has been performed.

Moreover, the MLME and the SME may exchange various MLME_GET/SET primitives through an MLME SAP (service access point). Furthermore, various PLME_GET/SET primitives may be exchanged between the PLME and the SME through PLME_SAP and may be exchanged between the MLME and the PLME through an MLME-PLME_SAP.

NAN (Neighbor Awareness Network) Topology

Figure 2:
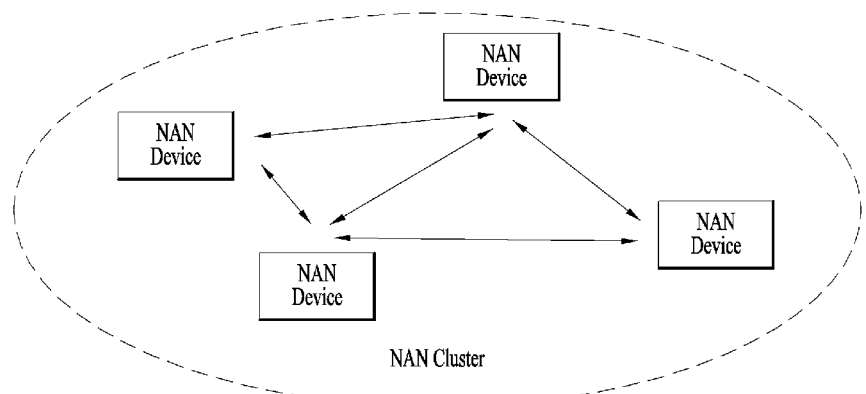
FIGS. 2 and 3 are diagrams illustrating examples of a NAN cluster.
Figure 3:
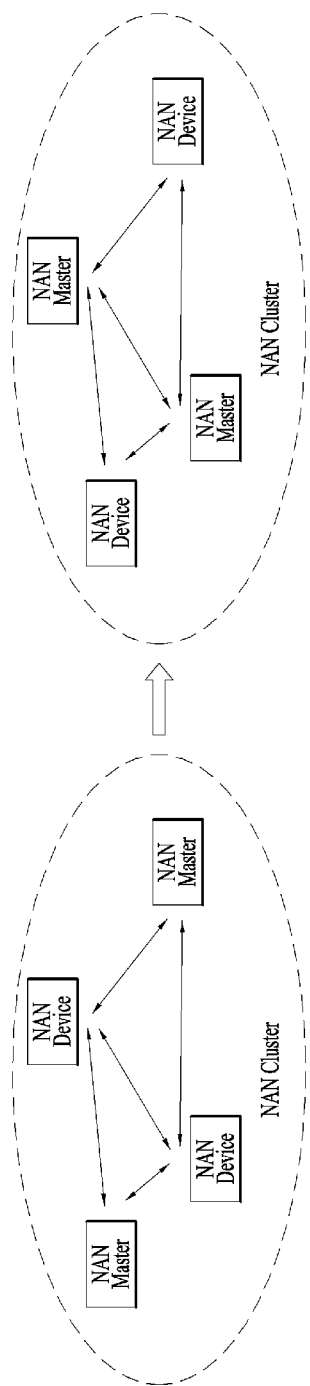

A NAN network can be constructed with NAN devices (terminals) that use a set of identical NAN parameters (e.g., a time interval between consecutive discovery windows, an interval of a discovery window, a beacon interval, a NAN channel, etc.). A NAN cluster can be formed by NAN devices and the NAN cluster means a set of NAN devices that are synchronized on the same discovery window schedule. And, a set of the same NAN parameters is used in the NAN cluster. FIG. 2 illustrates an example of the NAN cluster. A NAN device included in the NAN cluster may directly transmit a multicast/unicast service discovery frame to a different NAN device within a range of the discovery window. As shown in FIG. 3, at least one NAN master may exist in a NAN cluster and the NAN master may be changed. Moreover, the NAN master may transmit all of a synchronization beacon frame, discovery beacon frame and service discovery frame.

NAN Device Architecture

Figure 4:
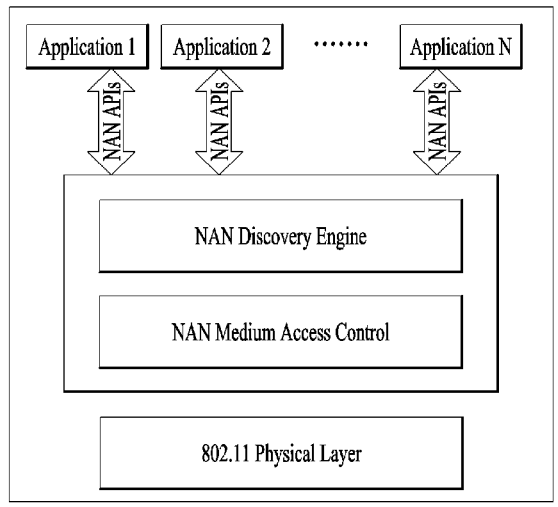
FIG. 4 illustrates an example of a structure of a NAN device.

FIG. 4 illustrates an example of a structure of a NAN device (terminal). Referring to FIG. 4, the NAN device is based on a physical layer in 802.11 and its main components correspond to a NAN discovery engine, a NAN MAC (medium access control), and NAN APIs connected to respective applications (e.g., Application 1, Application 2, . . . , Application N).

Figure 5:
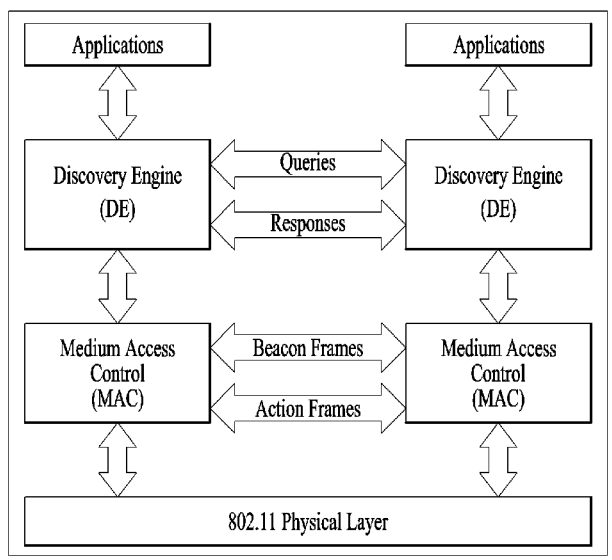
FIGS. 5 and 6 illustrate relations between NAN components.
Figure 6:
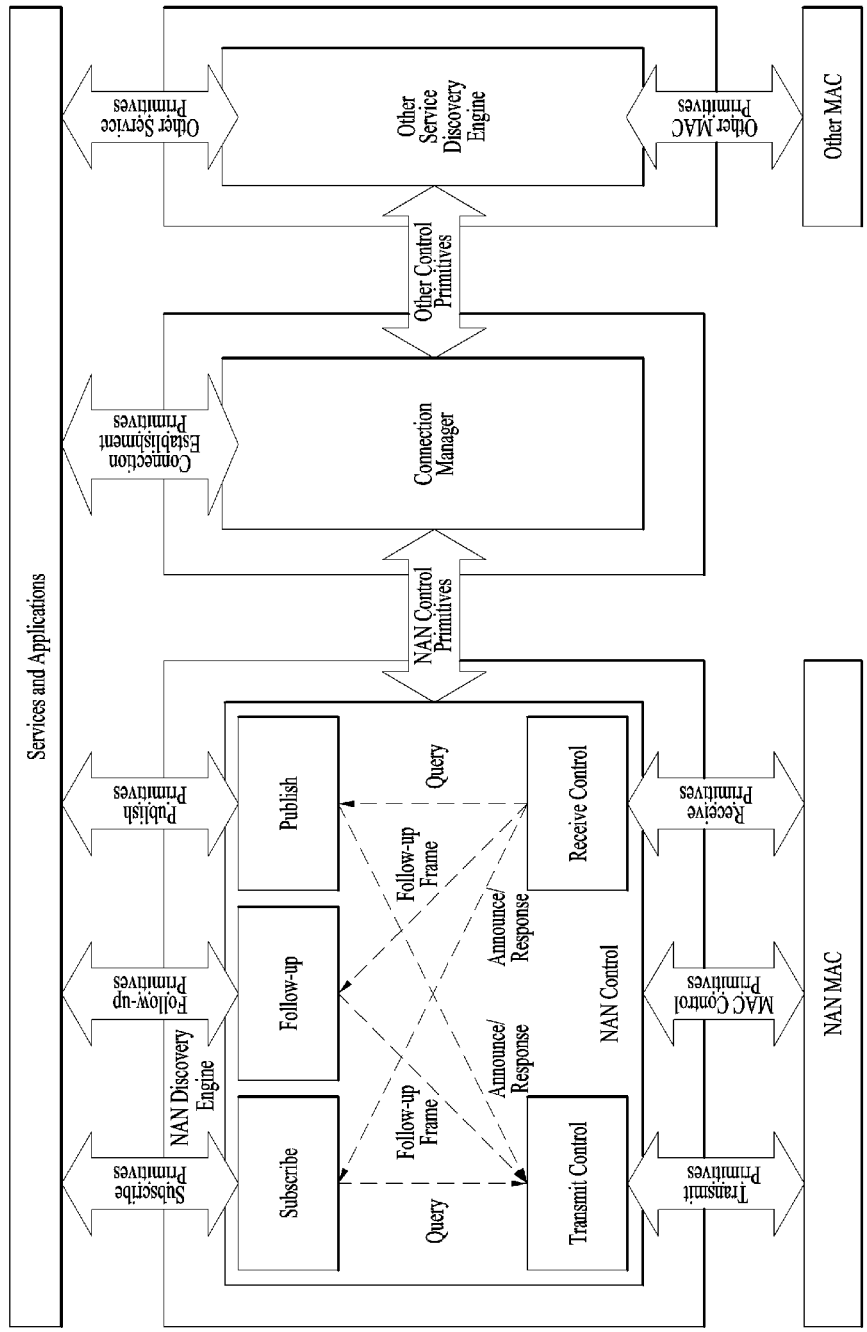

FIGS. 5 and 6 illustrate relations between NAN components. Service requests and responses are processed through the NAN discovery engine, and the NAN beacon frames and the service discovery frames are processed by the NAN MAC. The NAN discovery engine may provide functions of subscribing, publishing, and following-up. The publish/subscribe functions are operated by services/applications through a service interface. If the publish/subscribe commands are executed, instances for the publish/subscribe functions are generated. Each of the instances is driven independently and a plurality of instances can be driven simultaneously in accordance with the implementation. The follow-up function corresponds to means for the services/applications that transceive specific service information.

Role and State of NAN Device

Figure 7:
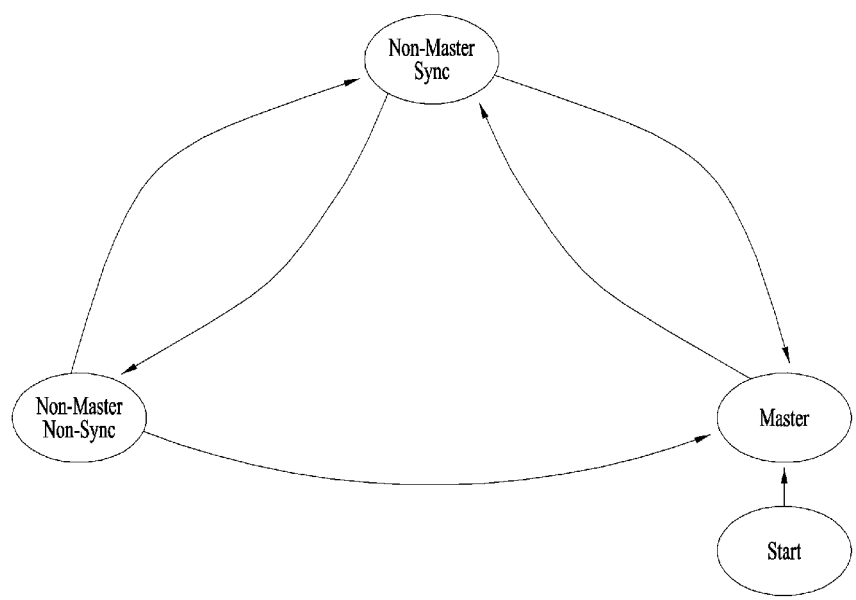
FIG. 7 is a diagram illustrating a state transition of a NAN device.

As mentioned in the foregoing description, a NAN device (terminal) can serve as a NAN master and the NAN master can be changed. In other words, roles and states of the NAN device can be shifted in various ways and related examples are illustrated in FIG. 7. The roles and states, which the NAN device can have, may include a master (hereinafter, the master means a state of master role and sync), a Non-master sync, and a Non-master Non-sync. Transmission availability of the discovery beacon frame and/or the synchronization beacon frame can be determined according to each of the roles and states and it may be set as illustrated in Table 1.

TABLE 1

| Role and State | Discovery Beacon | Synchronization Beacon |
| --- | --- | --- |
| Master | Transmission Possible | Transmission Possible |
| Non-Master Sync | Transmission Impossible | Transmission Possible |
| Non-Master Non-Sync | Transmission Impossible | Transmission Impossible |

The state of the NAN device can be determined according to a master rank (MR). The master rank indicates the preference of the NAN device to serve as the NAN master. In particular, a high master rank means strong preference for the NAN master. The NAN MR can be determined by Master Preference, Random Factor, Device MAC address, and the like according to Formula 1.

$$\text{MasterRank} = \text{MasterPreference} * 2^{56} + \text{RandomFactor} * 2^{48} + \text{MAC}[5] * 2^{40} + \ldots + \text{MAC}[0] \quad \text{[Formula 1]}$$

In Formula 1, the Master Preference, Random Factor, Device MAC address may be indicated through a master indication attribute. The master indication attributes may be set as illustrated in Table 2.

TABLE 2

| Field Name | Size (Octets) | Value | Description |
| --- | --- | --- | --- |
| Attribute ID | 1 | 0x00 | Identifies the type of NAN attribute. |
| Length | 2 | 2 | Length of the following field in the attribute |
| Master Preference | 1 | 0-255 | Information that is used to indicate a NAN Device's preference to serve as the role of Master, with a larger value indicating a higher preference. |
| Random Factor | 1 | 0-255 | A random number selected by the sending NAN Device. |

Regarding the above MR, in case of a NAN device that activates a NAN service and initiates a NAN cluster, each of the Master Preference and the Random Factor is set to 0 and NANWarmUp is reset. The NAN device should set a Master Preference field value in the master indication attribute to a value greater than 0 and a Random Factor value in the master indication attribute to a new value until when the NANWarmUp expires. When a NAN device joins a NAN cluster in which the Master Preference of an anchor master is set to a value greater than 0, the corresponding NAN device may set the Master Preference to a value greater than 0 and the Random Factor to a new value irrespective of expiration of the NANWarmUp.

Moreover, a NAN device can become an anchor master of a NAN cluster depending on an MR value. That is, all NAN devices have capabilities of operating as the anchor master. The anchor master means the device that has a highest MR and a smallest AMBTT (anchor master beacon transmit time) value and has a hop count (HC) (to the anchor master) set to 0 in the NAN cluster. In the NAN cluster, two anchor masters may exist temporarily but a single anchor master is a principle of the NAN cluster. If a NAN device becomes an anchor master of a currently existing NAN cluster, the NAN device adopts TSF used in the currently existing NAN cluster without any change.

The NAN device can become the anchor master in the following cases: if a new NAN cluster is initiated; if the master rank is changed (e.g., if an MR value of a different NAN device is changed or if an MR value of the anchor master is changed); or if a beacon frame of the current anchor master is not received any more. In addition, if the MR value of the different NAN device is changed or if the MR value of the anchor master is changed, the NAN device may lose the status of the anchor master. The anchor master can be determined according to an anchor master selection algorithm in the following description. In particular, the anchor master selection algorithm is the algorithm for determining which NAN device becomes the anchor master of the NAN cluster. And, when each NAN device joins the NAN cluster, the anchor master selection algorithm is driven.

If a NAN device initiates a new NAN cluster, the NAN device becomes the anchor master of the new NAN cluster. If a NAN synchronization beacon frame has a hop count in excess of a threshold, the NAN synchronization beacon frame is not used by NAN devices. And, other NAN synchronization beacon frames except the above-mentioned NAN synchronization beacon frame are used to determine the anchor master of the new NAN cluster.

If receiving the NAN synchronization beacon frame having the hop count equal to or less than the threshold, the NAN device compares an anchor master rank value in the beacon frame with a stored anchor master rank value. If the stored anchor master rank value is greater than the anchor master value in the beacon frame, the NAN device discards the anchor master value in the beacon frame. If the stored anchor master value is less than the anchor master value in the beacon frame, the NAN device newly stores values greater by 1 than the anchor master rank and the hop count included in the beacon frame and an AMBTT value in the beacon frame. If the stored anchor master rank value is equal to the anchor master value in the beacon frame, the NAN device compares hop counters. Then, if a hop count value in the beacon frame is greater than a stored value, the NAN device discards the received beacon frame. If the hop count value in the beacon frame is equal to (the stored value−1) and if an AMBTT value is greater than the stored value, the NAN device newly stores the AMBTT value in the beacon frame. If the hop count value in the beacon frame is less than (the stored value−1), the NAN device increases the hop count value in the beacon frame by 1. The stored AMBTT value is updated according to the following rules. If the received beacon frame is transmitted by the anchor master, the AMBTT value is set to the lowest four octets of time stamp included in the received beacon frame. If the received beacon frame is transmitted from a NAN master or non-master sync device, the AMBTT value is set to a value included in a NAN cluster attribute in the received beacon frame.

Meanwhile, a TSF timer of a NAN device exceeds the stored AMBTT value by more than 16*512 TUs (e.g., 16 DW periods), the NAN device may assume itself as an anchor master and then update an anchor master record. In addition, if any of MR related components (e.g., Master Preference, Random Factor, MAC Address, etc.) is changed, a NAN device not corresponding to the anchor master compares the changed MR with a stored value. If the changed MR of the NAN device is greater than the stored value, the corresponding NAN device may assume itself as the anchor master and then update the anchor master record.

Moreover, a NAN device may set anchor master fields of the cluster attributes in the NAN synchronization and discovery beacon frames to values in the anchor master record, except that the anchor master sets the AMBTT value to a TSF value of corresponding beacon transmission. The NAN device, which transmits the NAN synchronization beacon frame or the discovery beacon frame, may be confirmed that the TSF in the beacon frame is derived from the same anchor master included in the cluster attribute.

Moreover, a NAN device may adopt a TSF timer value in a NAN beacon received with the same cluster ID in the following case: i) if the NAN beacon indicates an anchor master rank higher than a value in an anchor master record of the NAN device; or ii) if the NAN beacon indicates an anchor master rank equal to the value in the anchor master record of the NAN device and if a hop count value and an AMBTT value in the NAN beacon frame are larger values in the anchor master record.

NAN Synchronization

NAN devices (terminals) participating in the same NAN Cluster may be synchronized with respect to a common clock. A TSF in the NAN cluster can be implemented through a distributed algorithm that should be performed by all the NAN devices. Each of the NAN devices participating in the NAN cluster may transmit NAN synchronization beacon frame (NAN sync beacon frame) according to the above-described algorithm. The NAN device may synchronize its clock during a discovery window (DW). A length of the DW corresponds to 16 TUs. During the DW, one or more NAN devices may transmit synchronization beacon frames in order to help all NAN devices in the NAN cluster synchronize their own clocks.

NAN beacon transmission is distributed. A NAN beacon frame is transmitted during a DW period existing at every 512 TU. All NAN devices can participate in generation and transmission of the NAN beacon according to their roles and states. Each of the NAN devices should maintain its own TSF timer used for NAN beacon period timing. A NAN synchronization beacon interval can be established by the NAN device that generates the NAN cluster. A series of TBTTs are defined so that the DW periods in which synchronization beacon frames can be transmitted are assigned exactly 512 TUs apart. Time zero is defined as a first TBTT and the discovery window starts at each TBTT.

Figure 8:
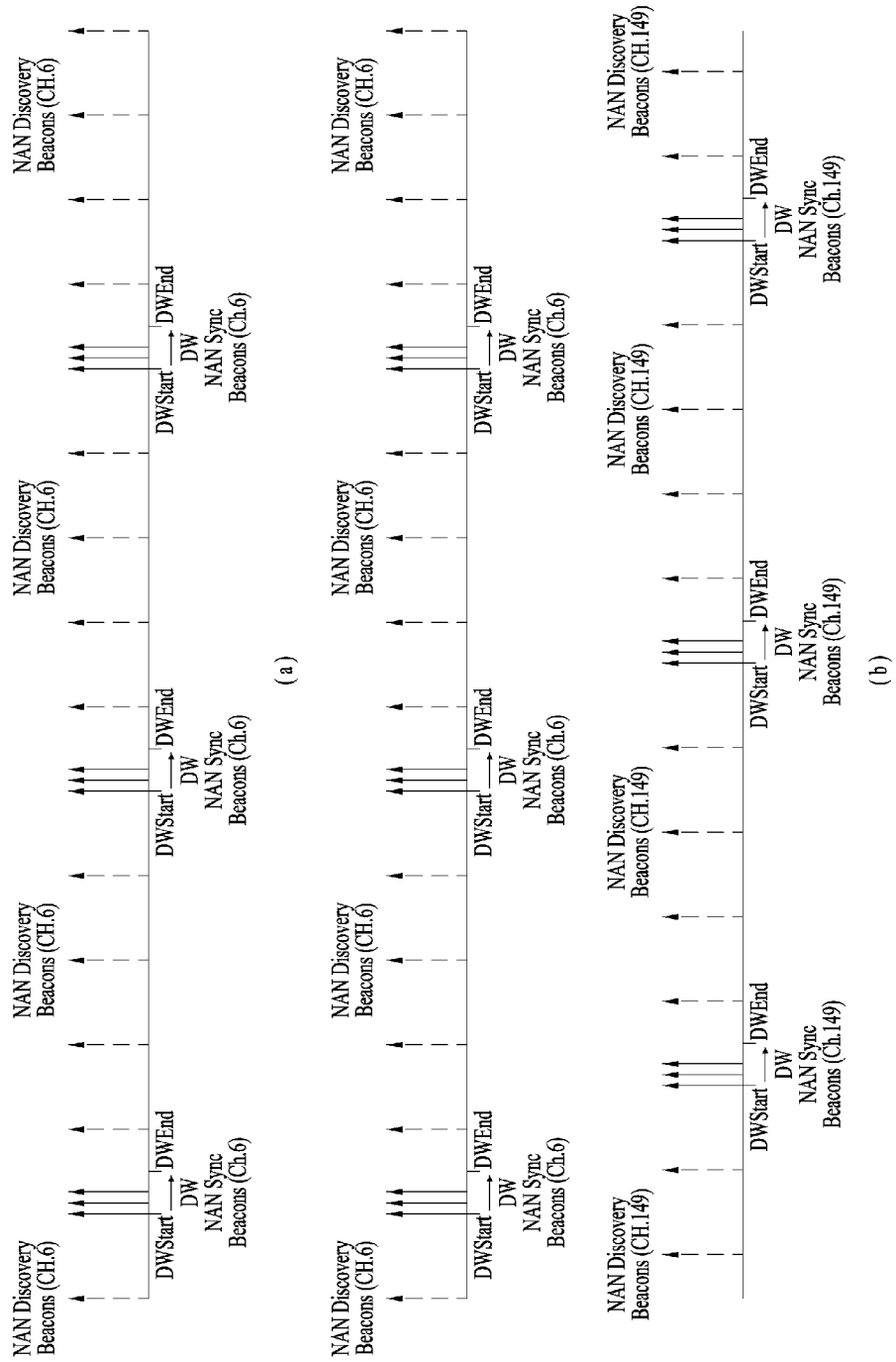

Each NAN device serving as a NAN master transmits a NAN discovery beacon frame from out of a NAN discovery window. On average, the NAN device serving as the NAN master transmits the NAN discovery beacon frame every 100 TUs. A time interval between consecutive NAN discovery beacon frames is smaller than 200 TUs. If a scheduled transmission time overlaps with a NAN discovery window of the NAN cluster in which the corresponding NAN device participates, the NAN device serving as the NAN master is able to omit transmission of the NAN discovery beacon frame. In order to minimize power required to transmit the NAN discovery beacon frame, the NAN device serving as the NAN master may use AC_VO (WMM Access Category—Voice) contention setting. FIG. 8 illustrates relations between a discovery window and a NAN discovery beacon frame and transmission of NAN synchronization/discovery beacon frames. Particularly, FIG. 8 (a) shows transmission of NAN discovery and synchronization beacon frames of a NAN device operating in 2.4 GHz band. FIG. 8 (b) shows transmission of NAN discovery and synchronization beacon frames of a NAN device operating in 2.4 GHz and 5 GHz bands.

Figure 9:
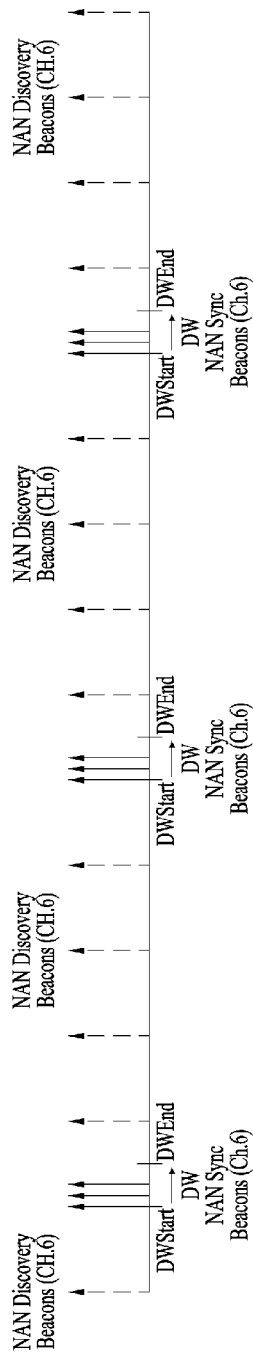
FIG. 9 is a diagram illustrating a discovery window.

FIG. 9 is a diagram illustrating a discovery window. As mentioned in the foregoing description, each NAN device performing a master role transmits a synchronization beacon frame within a discovery window and transmits a discovery beacon frame at the outside of the discovery window. In this case, as mentioned in the foregoing description, the discovery window can be repeated in every 512 TU. In this case, duration of the discovery window may correspond to 16 TUs. In particular, the discovery window can last during 16 TUs. In this case, for example, all NAN devices belonging to a NAN cluster may awake at every discovery window to receive a synchronization beacon frame from a master NAN device. By doing so, the NAN cluster can be maintained. In this case, if all NAN devices awake at every discovery window in a fixed manner, power consumption of the devices may get worse. Hence, it is necessary to have a method of reducing power consumption by dynamically controlling duration of a discovery window while synchronization is maintained in a NAN cluster.

For example, as mentioned in the foregoing description, a NAN device may operate in 2.4 GHz band or 5 GHz band. As a different example, a NAN device may operate in sub 1 GHz band. For example, a NAN device can be configured to support IEEE 802.11ah that supports sub 1 GHz band. For example, if a NAN device supports 900 MHz, it may have link quality and a physical model different from link quality and a physical model in 2.4 GHz or 5 GHz.

For example, if a NAN device supports 900 MHz, the NAN device can send a signal farther and perform communication in a wider range. In this case, data communication can be performed between NAN devices and data can be exchanged between NAN devices. In this case, since the data exchange is performed based on the data communication, a problem may exist in efficiently managing power in the NAN device. In order to solve the problem, it may differently configure a method of configuring a discovery window period. FIG. 9 shows a basic structure that a synchronization beacon frame is transmitted within a discovery window and a discovery beacon frame is transmitted at the outside of the discovery window. The basic structure can also be similarly applied to a NAN device supporting 900 MHz band.

For example, as mentioned in the foregoing description, a NAN device can transmit a service discovery frame (SDF) in a discovery window. In this case, the NAN device can discover a different NAN device capable of supporting a specific service through the service discovery frame. In this case, the service discovery frame may have a frame format described in Table 3 in the following.

TABLE 3

| Field | Size (Octets) | Value (Hex) | Description |
|---|---|---|---|
| Category | 1 | 0x04 | IEEE 802.11 Public Action Frame |
| Action Field | 1 | 0x09 | IEEE 802.11 Public Action Frame Vendor Specific |
| OUI | 3 | 0x50-6F-9A | Wi-Fi Alliance specific OUI |
| OUI Type | 1 | 0x13 | Identifying the type and version of the NAN |
| NAN Attributes | Variable | Variable | One or more NAN Attributes |

Referring to Table 3, the service discovery frame can include a field of NAN attribute. The NAN attribute field can be configured to have different information depending on a service discovery situation. Regarding this, it shall be described later. In particular, the NAN device transmits the service discovery frame including information on discovery within a discovery window period to discover a NAN device supporting a specific service.

Figure 10:
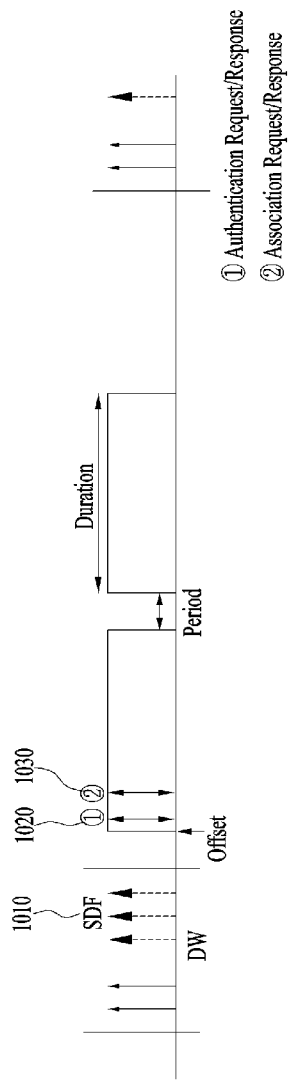
FIG. 10 is a diagram illustrating a method of exchanging an authentication frame and an association frame.

FIG. 10 is a diagram illustrating a method of exchanging an authentication frame and an association frame. A legacy NAN device performs service discovery only. The legacy NAN device does not perform data exchange. In this case, since a service is mutually provided between NAN devices, data exchange for the service is required and it is necessary to define the data exchange. In this case, it may additionally define a NAN data link (NDL) as a period for transmitting data for the service mutually provided between the NAN devices. The NAN devices can exchange data in a data path or a data duration belonging to the NAN data link. In this case, for example, when the NAN devices exchange data, the NAN device can perform authentication and association related to data transmission based on an attribute or a characteristic of the data.

In relation to this, when the NAN devices perform authentication and association, since it is necessary for the NAN devices to perform the authentication and the association by exchanging a new management frame for the authentication and the association several times, overhead may occur due to frame transmission and the like.

In this case, the NAN devices can make attribute information on the authentication and the association to be included in a service discovery frame to reduce an unnecessary procedure. By doing so, the NAN devices can simplify procedures to be performed later in the NAN data link for the authentication and the association.

More specifically, a NAN device can search for NAN devices supporting a specific service using the service discovery frame. The NAN device discovers a NAN device supporting a specific service via the service discovery frame and may be then able to exchange data for the specific service with the discovered NAN device. In this case, for example, the data exchanged between the NAN devices may correspond to data distinguished from each other according to a service or a service application. In particular, it may be able to configure the NAN device to discover a NAN device according to a service and perform data transmission according to a service.

When the NAN device exchanges data for the specific service with the discovered NAN device, the NAN device can determine whether or not it is necessary to perform authentication and association on the data of the specific service. For example, similar to the data transmission, the authentication and the association can also be determined according to a service.

More specifically, the NAN device can support a plurality of services or a plurality of service applications. In this case, data for a service among a plurality of the services may correspond to data requiring security. In particular, data exchange for a specific service can be performed on a specific NAN device only to which a service access is permitted. On the contrary, among a plurality of the services, in case of a service not requiring security or a service irrespective of whether or not data is opened, data of the service can be exchanged without an authentication procedure or an association procedure to omit an unnecessary procedure. In particular, when NAN devices exchange data with each other, the NAN devices can determine whether or not the authentication procedure and the association procedure are necessary according to a service.

In this case, for example, if it is determined as the authentication procedure and the association procedure are necessary to be performed on data of a specific service, authentication attribute information and association attribute information can be transmitted in a manner of being included in a service discovery frame. In this case, in order for NAN devices to exchange data for a service, it is necessary to preferentially discover a NAN device supporting the service. In particular, it is mandatory to perform a procedure of performing a service discovery in a manner that NAN devices exchange a service discovery frame with each other. In particular, if it is necessary to perform authentication and association on data of a specific service, it is necessary to include authentication attribute information and association attribute information in a service discovery frame, which is mandatorily exchanged between the NAN devices. By doing so, it is able to reduce an unnecessary procedure such as frame exchange and the like in authentication and association procedures.

For example, a first NAN device can discover a second NAN device supporting a first service via a service discovery frame. In this case, as mentioned in the foregoing description, the service discovery frame can be transmitted in a discovery window. The first NAN device can exchange data for the first service with the second NAN device after the second NAN device supporting the first service is discovered.

In this case, the first NAN device can determine whether or not at least one of authentication and association is necessary in transmitting data for the first service. For example, the first NAN device can determine that both the authentication and the association are necessary in transmitting the data for the first service. And, for example, the first NAN device can determine that the association is necessary only in transmitting the data for the first service without the authentication. And, for example, the first NAN device can determine that the authentication is necessary only in transmitting the data for the first service.

In this case, if the first NAN device determines that both the authentication and the association are necessary in transmitting the data for the first service, the first NAN device can exchange a service discovery frame including both authentication attribute information and association attribute information with the second NAN device.

If the first NAN device determines that the association is necessary only in transmitting the data for the first service, the first NAN device can exchange a service discovery frame including association attribute information with the second NAN device.

If the first NAN device determines that the authentication is necessary only in transmitting the data for the first service, the first NAN device can exchange a service discovery frame including authentication attribute information with the second NAN device.

In particular, when the first NAN device transmits the data for the first service, it may be able to configure necessary attribute information to be included in a service discovery frame, which is mandatorily transmitted, among the authentication and the association. By doing so, it may be able to omit a part of the procedures to be performed for the authentication and the association in transmitting the data for the first service, thereby reducing overhead.

More specifically, referring to FIG. 10, the first NAN device can transmit a service discovery frame 1010 within a discovery window. In this case, as mentioned in the foregoing description, the service discovery frame 1010 may correspond to a mandatorily exchanged frame and may include necessary attribute information among the authentication and the association. Subsequently, the first NAN device can transmit data by initiating a data path or a data duration at the timing away from the timing at which the discovery window ends as much as an offset value. In this case, for example, a period, which is not the discovery window, may correspond to the aforementioned NAN data link. In particular, data path or data duration for transmitting data can be configured from among the NAN data link.

In this case, for example, the attribute information included in the service discovery frame can include at least one selected from the group consisting of information on a data path or a data duration for which data is transmitted, offset information, and period information of data duration. In particular, information necessary for transmitting data can be included in the attribute information which is included in the service discovery frame.

And, for example, the first NAN device can exchange an authentication request/response frame 1020 with the second NAN device before data is exchanged between the first NAN device and the second NAN device after a data path is initiated. In this case, for example, the authentication request/response frame can be exchanged only when authentication attribute information is included in the service discovery frame when the first NAN device determines that the authentication is necessary in transmitting the data for the first service. And, for example, the authentication request/response frame can be exchanged using the authentication attribute information included in the service discovery frame. Subsequently, the first NAN device can exchange an association request/response frame with the second NAN device. In this case, for example, the association request/response frame can be exchanged only when association attribute information is included in the service discovery frame when the first NAN device determines that the association is necessary in transmitting the data for the first service. And, for example, the association request/response frame can be exchanged using the association attribute information included in the service discovery frame.

And, for example, the first NAN device exchanges the authentication and the association request/response frame in a period at which a data path is firstly initiated and may be able to continuously transmit data in every data path without passing through an authentication procedure from a next data path. In particular, a plurality of data paths may exist at the NAN data link according to time. The authentication and the association request/response frame are exchanged only in the first data path and the exchange of the authentication and the association request/response can be omitted in a manner of being regarded as an unnecessary procedure in the following data paths.

As a different example, the authentication request/response frame and the association request/response frame can be defined as a public action frame, by which the present invention may be non-limited.

Consequently, when two NAN devices perform service discovery via a service discovery frame and authentication and association are necessary according to a service or a service application, it may be able to obtain data path information from NAN data link through authentication attribute information and association attribute information included in the service discovery frame. Subsequently, the two NAN devices can perform authentication and association by transceiving a public action frame with each other at the first stage of a data path via information (offset, data duration, period, etc.) obtained by the service discovery frame without being allocated by a separate period for the authentication and the association.

In this case, for example, in case of a service or a service application not requiring authentication, it may be able to obtain data path information only of the NAN data link via the association attribute information. In this case, for example, the NAN devices can perform data transmission without exchanging both the authentication request/response frame and the association request/response frame in the data path. In particular, the NAN devices can directly exchange data without exchanging a separate frame for the authentication and the association using the information included in the service discovery frame.

In the following description, information on each of fields included in a service discovery frame is described in consideration of a case that authentication attribute information and association attribute information are optionally included in the service discovery frame.

For example, Table 4 in the following is similar to Table 3. Yet, unlike Table 3, OUI (organizationally unique identifier) type field can be defined by 0x14. In particular, an OUI type field value can be defined by 0x14 in consideration of a case that authentication attribute information and association attribute information are optionally included in a service discovery frame for compatibility. Yet, the OUI type field value can be changed with a different value and may be not restricted to 0x14. In particular, a legacy OUI type field value can be changed based on additional attribute information, by which the present invention may be non-limited.

TABLE 4

| Field | Size (Octets) | Value (HEX) | Description |
|---|---|---|---|
| Category | 1 | 0x04 | IEEE 802.11 Public Action Frame |
| Action Field | 1 | 0x09 | IEEE 802.11 Public Action Frame Vendor Specific |
| OUI | 3 | 0x50-6F-9A | WFA specific OUI |
| OUI Type | 1 | 0x14 (to be assigned) | Identifying the type and version of the NAN R2 |
| NAN Attributes | Variable | Variable | One or more NAN Attributes |

Table 5 shows a general format of NAN attribute field shown in Table 4. In this case, the NAN attribute field can include at least one selected from the group consisting of an attribute ID field, a length field, and an attribute body field. In this case, the attribute body field may have a variable size and other information can be included in the attribute body field based on NAN attribute.

TABLE 5

| Field | Size (Octets) | Value (Hex) | Description |
|---|---|---|---|
| Attribute ID | 1 | Variable | Identifies the type of NAN attribute as defined in Table 3 |
| Length | 2 | Variable | Length of the following fields in the attribute |
| Attribute Body Field | Variable | Variable | NAN Attribute specific information fields |

Table 6 shows attribute information capable of being included in a beacon frame and a service discovery frame. In this case, the attribute ID field shown in Table 5 can be defined by a different value to indicate a different attribute. For example, each of attribute information may or may not be included in a beacon frame and a service discovery frame. And, for example, specific attribute information among the attribute information can be mandatorily included (represented as "M" in the Table) or optionally included (represented as "O" in the Table).

As mentioned in the foregoing description, if the authentication attribute information and the association attribute information are necessary based on data exchange for a service, the authentication attribute information and the association attribute information can be optionally included in the service discovery frame.

TABLE 6

| Attribute ID | Description | NAN Beacons | | |
|---|---|---|---|---|
| | | Sync | Discovery | NAN SDF |
| 0 | Master Indication Attribute | YES/M | YES/M | NO |
| 1 | Cluster Attribute | YES/M | YES/M | NO |
| 2 | Service ID List Attribute | YES/O | YES/O | NO |
| 3 | Service Descriptor Attribute | NO | NO | YES/M |
| 4 | NAN Connection Capability Attribute | NO | NO | YES/O |
| 5 | WLAN Infrastructure Attribute | NO | NO | YES/O |
| 6 | P2P Operation Attribute | NO | NO | YES/O |
| 7 | IBSS Attribute | NO | NO | YES/O |
| 8 | Mesh Attribute | NO | NO | YES/O |
| 9 | Further NAN Service Discovery Attribute | NO | NO | YES/O |
| 10 | Further Availability Map Attribute | NO | NO | YES/O |
| 11 | Country Code Attribute | YES/O | YES/O | YES/O |
| 12 | Ranging Attribute | NO | NO | YES/O |
| 13 | Cluster Discovery Attribute | NO | NO | NO |
| 14 | Authentication Attribute | NO | NO | YES/O |
| 15 | Association Attribute | NO | NO | YES/O |
| 16-220 | Reserved | NA | NA | NA |
| 221 | Vendor Specific Attribute | YES/O | YES/O | YES/O |
| 222-255 | Reserved | NA | NA | NA |

Tables 7 and 8 in the following show a format of the authentication attribute information and a format of the association attribute information, respectively. In this case, for example, among the attribute information included in the NAN attribute body field, an attribute 14 and an attribute 15 are not previously defined. In this case, for example, the attribute 14 and the attribute 15 are defined as authentication/association information for a case that NAN devices exchange data according to a service.

In this case, each of the attribute information can be represented as Table 7 and Table 8. For example, as mentioned in the foregoing description, if authentication and association are required by a service or a service application, the aforementioned attributes are additionally transmitted to the service discovery frame to provide authentication information and association information necessary for transmitting data.

For example, if authentication between two NAN devices is not necessary based on a service or user information, it may directly include association attribute information only without transmitting authentication attribute information. In this case, for example, it may immediately start data transmission based on the association attribute information without exchanging authentication and association frames at an offset point at which data transmission starts in NAN data link.

More specifically, referring to Table 7, the authentication attribute information can include at least one selected from the group consisting of an attribute ID field, a length field, a service ID field, and a device info field. In particular, the authentication attribute can include information on NAN devices for security. Referring to Table 8, the association attribute information can include at least one selected from the group consisting of an attribute ID field, a length field, a service ID field, a channel information field, an offset field, a data duration field, and a period field. In particular, the association attribute can include information necessary for transmitting data. In particular, if authentication is not necessary, the NAN devices can immediately start data transmission without exchanging authentication and association frames in a data path using the association attribute information included in the service discovery frame. By doing so, it may be able to reduce an unnecessary procedure, thereby reducing overhead.

TABLE 7

| Field Name | Size (Octets) | Value | Description |
| --- | --- | --- | --- |
| Attribute ID | 1 | 0x00 | Identifies the type of NAN attribute. |
| Length | 2 | 2 | Length of the following field in the attribute. |
| Service ID | 1 | — | Service ID presents Group ID |
| Device info | 1 | — | The NAN device information |

TABLE 8

| Field Name | Size (Octets) | Value | Description |
| --- | --- | --- | --- |
| Attribute ID | 1 | 0x00 | Identifies the type of NAN attribute. |
| Length | 2 | 2 | Length of the following field in the attribute. |
| Service ID | 1 | — | Service ID presents Group ID |
| Channel information | 1 | Variable | Indicating the channel the NAN Device will be available. |
| Offset | 1 | — | Offset from the beginning of data path |
| Data duration | 1 | — | Data path duration |
| Period | 1 | — | Period between data durations |
| Reserved | — | — | Reserved |

For example, as mentioned in the foregoing description, an authentication request/response frame and an association request/response frame can be exchanged before data is transmitted in a data path.

In this case, as mentioned in the foregoing description, the authentication request/response frame and the association request/response frame may correspond to an action frame. Table 9 in the following shows fields included in the action frame.

TABLE 9

| Field Name | Size (Octets) | Value | Description |
| --- | --- | --- | --- |
| Category | 1 | 0xXX | IEEE 802.11 vender specific usage |
| OUI | 3 | 50 6F 9A | WFA specific OUI |
| OUI type | 1 | 0x14 (to be assigned) | Identifying the type or version of action frame. Setting to 14 could be indicated as NAN R2 |
| OUI Subtype | 1 | — | Identifying the type of NAN R2 action frame. The specific value is defined in Table 7. |
| Dialog Token | 1 | — | When set to a nonzero value, used to identify the request/response transaction. |
| Elements | variable | — | Including NAN IE or any information elements defined in IEEE Std 802.11-2012. |

In this case, for example, it is necessary to distinguish types of an authentication request frame, an authentication response frame, an association request frame, and an association response frame. The types of the action frame can be defined based on Table 10 in the following.

TABLE 10

| Type | Notes |
| --- | --- |
| 0 | Notice of Absence |
| 1 | NAN Authentication Request |
| 2 | NAN Authentication Response |
| 3 | NAN Association Request |
| 4 | NAN Association Response |
| 5-255 | Reserved |

For example, Table 11 in the following shows field information included in the authentication request frame.

TABLE 11

| Attributes | Note |
| --- | --- |
| Status code | The status code information is reserved in certain Authentication frames. |
| DH Public value | Pairwise key derivation via password-authenticated Diffie-Hellman (DH) exchange |
| Private Nonce | Nonce |
| Vendor Specific | One or more vendor specific elements are optionally present. These elements follow all other elements. |

For example, Table 12 in the following shows field information included in the authentication response frame.

In this case, for example, two NAN devices make a pairwise master key (PMK) using DH shared secret. And, it may form a pairwise transient key (PTK) via a delivered PMK and nonce. In particular, if a NAN device requesting a service delivers a DH public value and nonce of the device to a partner NAN device via an authentication request frame, the partner NAN device delivers a DH public value and nonce of the partner NAN device to the NAN device via an authentication response frame. As a result, the two NAN devices are able to know a common PTK and may be able to succeed in authentication. Regarding this, it shall be described later.

TABLE 12

| Attributes | Note |
| --- | --- |
| Status code | The status code information is reserved in certain Authentication frames |
| DH Public value | Pairwise key derivation via password-authenticated Diffie-Hellman (DH) exchange |
| Private Nonce | Nonce |
| Confirm | This is present in SAE authentication frames. |
| Vendor Specific | One or more vendor specific elements are optionally present. These elements follow all other elements. |

For example, Table 13 in the following shows field information included in the association request frame.

TABLE 13

| Attributes | Note |
| --- | --- |
| Status code | The status code information is reserved in certain Association frames. |
| Association ID | Association ID |
| Vendor Specific | One or more vendor specific elements are optionally present. These elements follow all other elements. |

For example, Table 14 in the following shows field information included in the association response frame.

In this case, for example, after the two NAN devices succeeded in authentication, the devices can perform an association procedure. In this case, the NAN device requesting the service includes an association ID of the NAN device in the association request frame and may be able to transmit the association request frame to the partner NAN device. In this case, the partner NAN device is able to check an association procedure by including CGK in the response.

TABLE 14

| Attributes | Note |
| --- | --- |
| Status code | The status code information is reserved in certain Association frames. |
| Association ID | Association ID |
| CGK | Common Group Key |
| Vendor Specific | One or more vendor specific elements are optionally present. These elements follow all other elements. |

Figure 11:
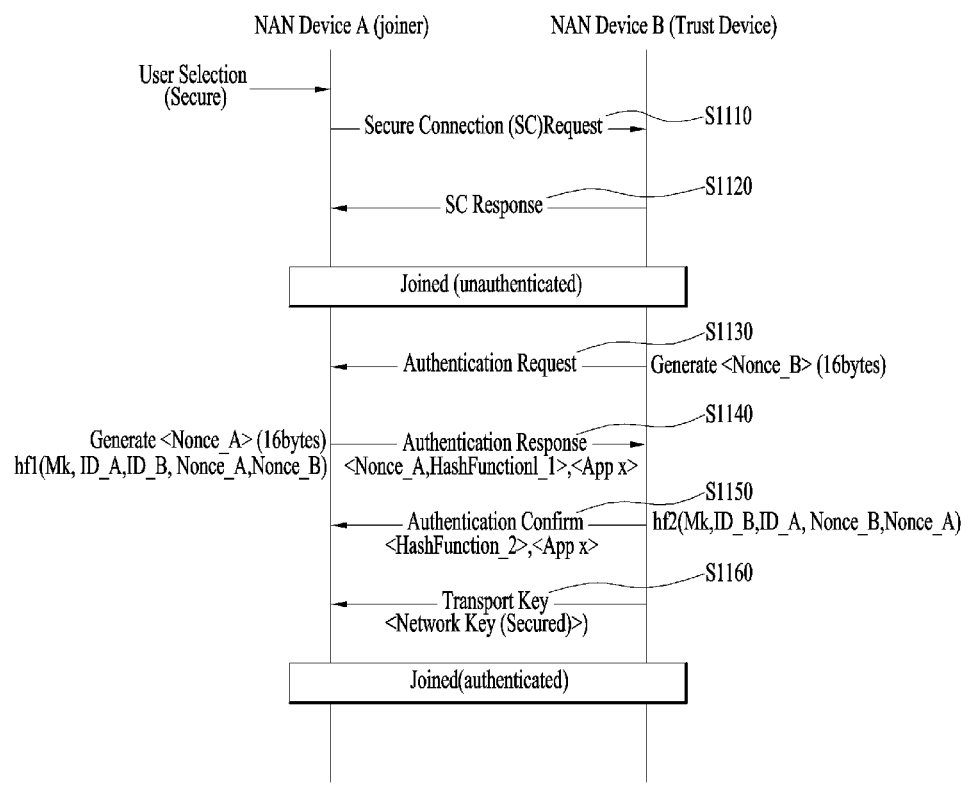
FIG. 11 is a flowchart illustrating a method for NAN devices to perform authentication.

FIG. 11 is a flowchart illustrating a method for NAN devices to perform authentication.

As mentioned in the foregoing description, NAN devices can exchange data for a service with each other according to a service. In order for the two NAN devices to use a service or a service application, it is necessary to perform a security procedure by passing through an authentication procedure according to a service or a service application. In this case, as mentioned in the foregoing description, the authentication procedure can be performed according to data of the service or the service application.

In the following, an authentication procedure is described. The authentication procedure can be performed on data transmission according to a service or a service application after a master key and a local authentication key are shared.

More specifically, the authentication procedure may use a public key infrastructure or a master key to manage an authentication certificate key of security. In this case, the public key based authentication may have a superior characteristic in distributing a key and may be able to support integrity and non-repudiation. Hence, efficient security key authentication is necessary for NAN devices to perform mutual authentication and guarantee a data path which is secured by applying a secret session key.

In this case, for example, a NAN device may set a security level to use a service or a service application. In particular, as mentioned in the foregoing description, the NAN device can determine whether or not authentication and association are necessary in transmitting data for a service.

In this case, for example, the security level can be defined by an open mode or a secure mode in relation to authentication. In this case, the open mode may correspond to a mode that the NAN device uses no security procedure to use a specific service or a service application.

On the contrary, the secure mode may correspond to a mode requiring security authentication for a secure data path when the NAN device uses a specific service or a service application. In particular, the secure mode may correspond to a mode that authentication is required and authentication frame exchange is required.

In this case, data for a service can be exchanged in a data path in the open mode. On the contrary, NAN devices exchange an authentication request/response frame including a key and a hash function with each other in the secure mode to perform security authentication. In this case, for example, as mentioned in the foregoing description, it may be able to perform an authentication procedure on a data path according to a service or a service application.

Referring to FIG. 11, for example, two NAN devices performing data exchange can obtain the same master key (MK) and the same local authentication key (LK) from a master device in a discovery window period. In particular, the two NAN devices correspond to NAN devices operating based on the same master device and can obtain common information.

In this case, for example, a NAN device A corresponds to a joiner and can select a secure mode to exchange data with a NAN device B. In this case, for example, the NAN device A can transmit a secure connection request message to the NAN device B [S1110]. In this case, for example, the secure connection request message may be identical to an association request message. And, for example, the NAN device A may request a secure connection to the NAN device B via a message of a different form, by which the present invention may be non-limited.

Having received the secure connection request message, the NAN device B can transmit a secure connection response message to the NAN device A [S1120]. In this case, for example, the secure connection response message may be identical to an association response message. And, for example, the NAN device B can deliver a response for a secure connection to the NAN device A via a message of a different from, by which the present invention may be non-limited.

When the NAN device A receives the secure connection response from the NAN device B, although the NAN device A and the NAN device B are joined together, the NAN device A and the NAN device B may be in an unauthenticated state.

As a different example, it may perform a service discovery by exchanging a service discovery frame between the NAN device A and the NAN device B while the aforementioned steps S1110 and S1120 are not performed. In this case, authentication attribute information can be included in the service discovery frame. In particular, although the NAN devices determine that authentication is necessary, the NAN devices perform service discovery and may stay in an unauthenticated state, by which the present invention may be non-limited.

Subsequently, the NAN device B can generate a nonce B. In this case, for example, the nonce B may correspond to a random nonce having a length of 16 bytes and a value. In this case, the NAN device B can transmit an authentication request message including the generated nonce B to the NAN device A [S1130].

Subsequently, the NAN device A can generate a nonce A for authentication response. In this case, for example, the nonce A may correspond to a random nonce having a length of 16 bytes and a value. The NAN device A can generate a first hash function (hf1) using at least one selected from the group consisting of a shared master key, an ID of the NAN device A, an ID of the NAN device B, the nonce A and the received nonce B. In this case, the NAN device A can transmit an authentication response message including the nonce A and the first hash function to the NAN device B. For example, since the authentication is performed according to a service, the NAN device A can transmit the authentication response message to the NAN device B in a manner of including an ID of an application or a service ID in the authentication response message [S1140].

Subsequently, the NAN device B can generate a secure data path for a service or a service application, which is used together with the NAN device A. In this case, in order for the NAN device B to inform the NAN device A of information on the secure data path, the NAN device B can transmit an authentication confirm message to the NAN device A [S1150].

In this case, for example, the NAN device B can generate a second hash function using at least one selected from the group consisting of a shared master key, an ID of the NAN device B, an ID of the NAN device A, the nonce A and the received nonce B. In this case, the NAN device B can transmit the authentication confirm message to the NAN device A only when the first hash function and the second hash function have the same value. And, for example, the authentication confirm message can include ID information on a service or a service application. Through the aforementioned procedures, the NAN devices can determine that a secure data path for a service or a service application is formed.

Subsequently, the NAN device B transmits a network key encrypted by a local authentication key [S1160]. If the aforementioned procedures are all performed, the two NAN devices are able to complete authentication on secure data path formation.

Figure 12:
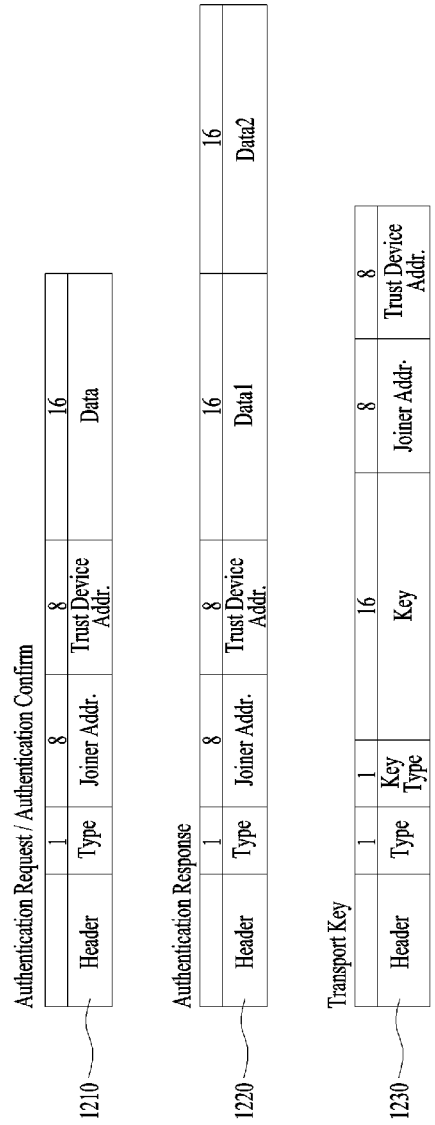
FIG. 12 is a diagram illustrating authentication-related frame information.

FIG. 12 is a diagram illustrating authentication-related frame information.

It may be able to transmit an authentication-related message (or frame) in the authentication procedures mentioned earlier in FIG. 11. FIG. 12 shows a message (or frame) format transmitted in each of the procedures. In this case, for example, when the message (or frame) format is determined, the message format can be defined by a packet length less than 127 bytes, which is less than a maximum length of a payload permitted by MAC layer of IEEE 802.11. In this case, it may refer to the contents of IEEE 802.11 standard document for information on the MAC layer of IEEE 802.11. In particular, it may be able to perform an authentication procedure using message (or frame) formats shown in FIG. 12. Since a length of a packet generated by MAC layer is less than 127 bytes (maximum allowed value) for all messages shown in FIG. 12, it may be able to use the packet length with no problem in implementing a protocol.

For example, a key used for an authentication procedure can be defined based on information commonly known to NAN devices. In particular, the NAN devices can use a part of group information, which is known for NAN communication, as a shared key.

In this case, for example, it was able to periodically change a service ID or use a unique service ID for security of a user. In this case, the service ID was able to be generated based on an encryption function configured to output a cryptogram (e.g., hash data) of a fixed length by receiving information of a random length as an input. For example, SHA (secure hash algorithm)-256 as an encryption function can be used as a uni-directional encryption scheme.

In this case, for example, the service ID can be configured by top 48 bits among 256 bits of a hash value, which is generated by encrypting information of a service name, a key, and a timestamp using the SHA-256.

In particular, the service ID can be generated based on equation 2 described in the following.

$$\text{Service ID} = \text{SHA-256}(\text{Service Name} \| \text{Key} \| m\text{Timestamp}) \quad \text{[Equation 2]}$$

In this case, for example, the service name and the timestamp may correspond to information already shared between the NAN devices. And, for example, the key information may correspond to information shared between the NAN devices via out-of-band. In particular, the service ID may correspond to a value generated by an encryption function using information shared between the NAN devices. By doing so, the service ID used between the NAN devices can be generated.

In this case, for example, as mentioned in the foregoing description, a hash value of the generated service ID can be used as a shared key between the NAN devices. In particular, if information shared between the NAN devices is used as a shared key, it may be able to omit an additional procedure for obtaining a shared key, thereby reducing overhead.

In this case, for example, the hash value of the service ID can be used for data encryption.

More specifically, in order to perform encryption on a data frame, it is necessary to perform a procedure of sharing data via a discovery window period or a non-discovery window period to share a separate encryption data. In this case, for example, as mentioned in the foregoing description, if a hash value of a service ID generated by an encryption function is used for encrypting a data frame, it may be able to omit an unnecessary procedure.

In this case, for example, all hash values generated by a service ID can be used for encrypting a data frame. For example, as mentioned in the foregoing description, all data of 256 bits generated by the SHA-256 can be used.

As a different example, it may use a part of hash values only generated by a service ID to encrypt a data frame. In this case, for example, a hash value of 48 bits used as a service ID can be used as it is among the hash value of 256 bits generated by the SHA-256.

And, for example, in order to encrypt a NAN data frame transmitted via a NAN data path, as mentioned in the foregoing description, it may use an encryption algorithm of a legacy shared key (or symmetric key) scheme.

In this case, for example, a size of an encryption key may vary according to the encryption algorithm. Hence, as mentioned in the foregoing description, it may be necessary to have a method of using a hash value, which is generated by an encryption function via a service name, a key, and a timestamp, based on the encryption algorithm.

For example, in case of an AES encryption algorithm, it may be able to use encryption keys of 128, 192, and 256 bits. In case of a DES encryption algorithm, it may be able to use an encryption key of 56 bits.

As mentioned in the foregoing description, in order to use a different encryption algorithm, it may use an embodiment such as Table 15 in the following.

TABLE 15

40bits symmetric key = Top 40 bits of SHA-256(Service Name||Key||mTimestamp
56bits symmetric key = Top 56 bits of SHA-256(Service Name||Key||mTimestamp
64bits symmetric key = Top 64 bits of SHA-256(Service Name||Key||mTimestamp
80bits symmetric key = Top 80 bits of SHA-256(Service Name||Key||mTimestamp
128bits symmetric key = Top 128 bits of SHA-256(Service Name||Key||mTimestamp
256bits symmetric key = Value of SHA-256(Service Name||Key||mTimestamp In particular, as shown in Table 15, it may be able to perform encryption on a data frame using all or a part of hash values of a service ID based on an encryption algorithm.

As a different example, if a length of a key required by an encryption algorithm is equal to or greater than 256 bits, as shown in Table 16, it may use a method of extending a key length by changing an order of input values. The method of extending a key length by changing an order of input values can be generated in various ways as well as the combination shown in Table 16, by which the present invention may be non-limited.

300bits symmetric key = top 44 bits of (SHA-256 (Service Name || Key || mTimestamp))||
SHA-256 (Service Name || mTimestamp || Key)
512bits symmetric key = (SHA-256 (Service Name || Key || mTimestamp))|| (SHA-256
(Service Name || mTimestamp || Key))
1024bits symmetric key = (SHA-256 (Service Name || Key || mTimestamp))|| (SHA-256
(Service Name || mTimestamp || Key)) || (SHA-256 (Key || mTimestamp || Service Name)) ||
(SHA-256 (mTimestamp || Service Name || Key))

More specifically, referring to Table 16, it may be able to generate a key of a size greater than 256 bits by combining values capable of being generated by an encryption function. In particular, a length of a key can be controlled based on the encryption algorithm.

For example, an input value used by an encryption function may correspond to a service ID, a key, and a timestamp. Yet, this is just an example for an input value used by an encryption function. The present invention is not restricted by the embodiment. In particular, information commonly known to NAN devices within a NAN cluster can be used as the input value.

For example, NAN cluster address (48 bits), anchor master rank and anchor master beacon transmission time included in anchor master information belonging to a cluster attribute, and the like can be used as the input value. And, it may be able to differently configure the number of input values used by an encryption function, by which the present invention may be non-limited.

In particular, it may be able to use at least one selected from the group consisting of a service name, a key, a timestamp, and shared information as an input value. In this case, for example, equation 3 in the following can represent a hash value of a service ID generated by SHA-256 using a different input value.

Service ID SHA-256(Service Name||Key||mTimestamp||NAN Cluster address||Anchor Master Information||Anchor Master Beacon Transmission Time)| [Equation 3]

As a different example, the service ID can be used not only for encryption of a data frame but also for authentication. In this case, as mentioned in the foregoing description, in order to exchange data for a service, it is necessary for NAN devices to perform authentication.

As mentioned in the foregoing description, key distribution can be performed for the authentication. In this case, for example, it may be able to use a hash value of a service ID, which is shared between NAN devices, as a shared key used for the key distribution. In this case, for example, a key used for the authentication can be generated using a method identical to the method of generating a key used for encrypting a data frame. In particular, for the authentication, similar to the equations 2 and 3 and Tables 15 and 16, it may be able to use all or a part of hash values based on an encryption algorithm, by which the present invention may be non-limited.

And, for example, an ID of a paging group may use a hash value of a service ID. For example, in order for NAN devices to share a channel, a paging scheme can be defined for a NAN data link. In this case, it is necessary for each of NAN groups (NAN data groups or NDL groups) to have a unique paging group ID. In this case, a hash value of a service ID can be used to encrypt a paging group ID. For example, the hash value of the service ID used for the paging group ID can be generated by a method identical to the method of generating a key used for encrypting a data frame. In particular, for the paging group ID, similar to the equations 2 and 3 and Tables 15 and 16, it may be able to use all or a part of hash values based on an encryption algorithm, by which the present invention may be non-limited.

In the foregoing description, a case of encrypting a specific bit value or performing key distribution using a part of hash values is explained. Yet, it may not be restricted to the specific bit. In particular, it may use all of a part of the hash values according to a security level or data communication environment, by which the present invention may be non-limited.

Figure 13:
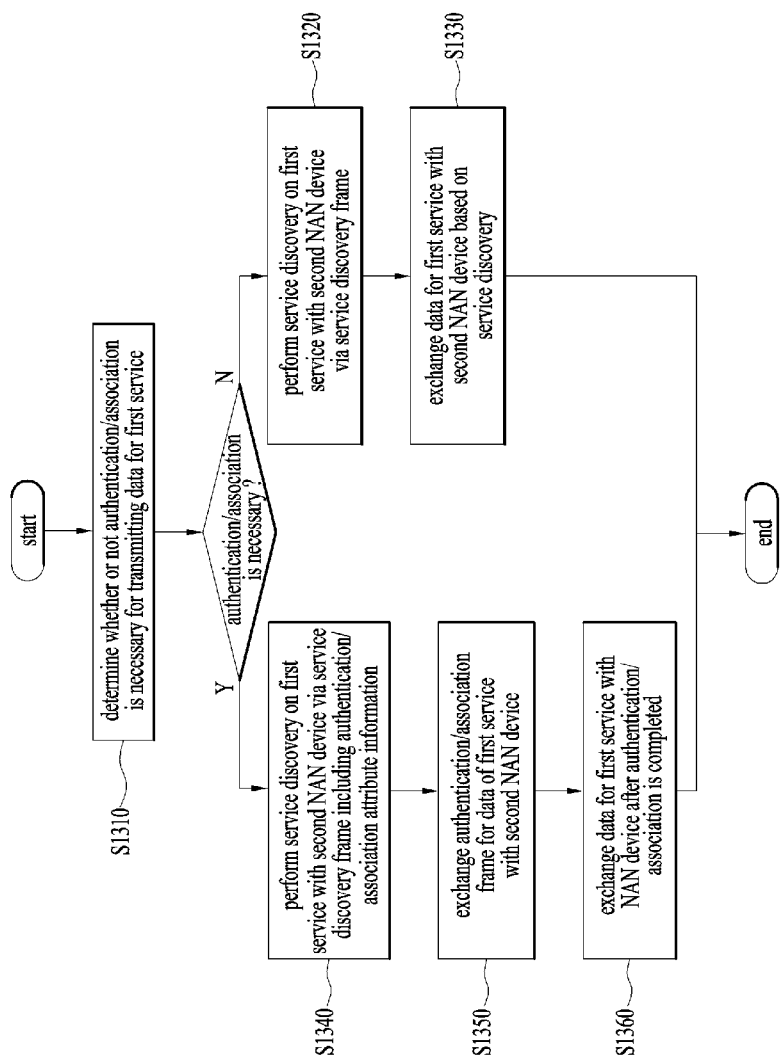
FIG. 13 is a flowchart for a method of transmitting data.

FIG. 13 is a flowchart for a method of transmitting data.

A first NAN device can determine whether or not authentication and association are necessary in transmitting data for a first service [S1310]. In this case, as mentioned earlier in FIGS. 10 to 12, the first NAN device can exchange the data for the first service corresponding to a specific service with a second NAN device. In particular, the data can be exchanged according to a service. And, for example, whether or not the authentication is necessary and whether or not the association is necessary can be determined, respectively. In particular, in case of transmitting the data for the first service, the authentication is necessary only. In case of transmitting the data for the first service, the association is necessary only. And, in case of transmitting the data for the first service, both the authentication and the association are necessary. In particular, whether or not the authentication is necessary and whether or not the association is necessary can be determined, respectively. The present invention is not restricted by the aforementioned embodiment.

Subsequently, if the authentication and the association are not necessary, the first NAN device and the second NAN device can perform a service discovery via a service discovery frame [S1320]. In this case, as mentioned earlier in FIGS. 10 to 12, attribute information on the authentication and attribute information on the association may not be included in the service discovery frame. Subsequently, the first NAN device can exchange the data for the first service with the second NAN device based on the service discovery [S1330]. In this case, as mentioned earlier in FIGS. 10 to 12, the first NAN device and the second NANA device may not exchange an authentication frame and an association frame with each other before the data is exchanged. In particular, the first NAN device and the second NAN device can exchange the data for the first service with each other without the authentication and the association procedures in a data path after the first service is discovered.

On the contrary, if the authentication and the association are necessary, the first NAN device and the second NAN device can perform a service discovery on the first service via a service discovery frame including the authentication attribute information and the association attribute information [S1340]. In this case, as mentioned earlier in FIGS. 10 to 12, whether or not the authentication is necessary and whether or not the association is necessary can be determined, respectively. If the authentication is necessary, the authentication attribute information can be included in the service discovery frame. If the association is necessary, the association attribute information can be included in the service discovery frame. If both the authentication and the association are necessary, both the authentication attribute information and the association attribute information can be included in the service discovery frame.

Subsequently, the first NAN device can exchange the authentication frame and the association frame for the data of the first service with the second NAN device [S1350]. In this case, as mentioned earlier in FIGS. 10 to 12, the authentication frame and the association frame can be exchanged in a data path before the data is exchanged. And, for example, the authentication frame and the association frame can be exchanged in a first data path only among a plurality of data paths. And, for example, the authentication frame and the association frame can be exchanged using the authentication attribute information and the association attribute information included in the service discovery frame.

Subsequently, after the authentication and the association are completed, the first NAN device can exchange the data for the first service with the second NAN device [S1360]. In this case, as mentioned earlier in FIGS. 10 to 12, the data can be exchanged according to a service.

Figure 14:
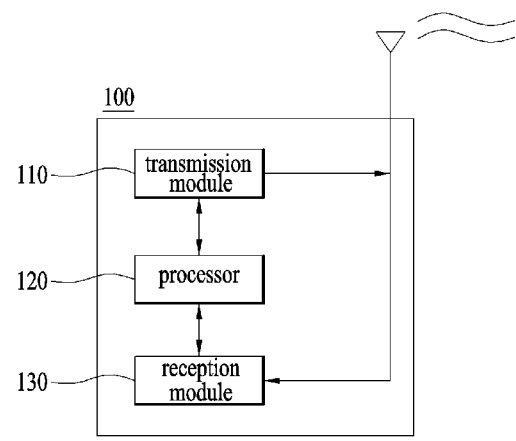
FIG. 14 is a block diagram for a device.

FIG. 14 is a block diagram for a device.

A device may correspond to a NAN device included in a cluster. In this case, as mentioned in the foregoing description, the device can transmit a service discovery frame to another device in a discovery window. By doing so, the device can perform service discovery.

In this case, the device 100 can include a transmission module 110 configured to transmit a radio signal, a reception module 130 configured to receive a radio signal, and a processor 120 configured to control the transmission module 110 and the reception module 130. In this case, the device 100 can perform communication with an external device using the transmission module 110 and the reception module 130. In this case, the external device may correspond to a different device. And, the external device may correspond to a base station. In particular, the external device may correspond to a device capable of performing communication with the device 100, by which the present invention may be non-limited. The device 100 can transmit and receive digital data such as contents using the transmission module 110 and the reception module 130. And, the device 100 can exchange a beacon frame, a service discovery frame, and the like using the transmission module 110 and the reception module 130, by which the present invention may be non-limited. In particular, the device 100 performs communication using the transmission module 110 and the reception module 130 and may be able to exchange information with an external device.

According to one embodiment of the present specification, the device 100 can perform data transmission on a service. In this case, the processor 120 can discover a different device supporting a first service via a service discovery frame. And, the processor 120 can exchange data for the service with the different device based on a performed service discovery. in this case, if at least one of authentication and association is necessary in transmitting the data of the service, attribute information necessary for transmitting the data among authentication attribute information and association attribute information can be included in the service discovery frame.

The embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

And, both an apparatus invention and a method invention are explained in the present specification and the explanation on both of the inventions can be complementally applied, if necessary.

INDUSTRIAL APPLICABILITY

Although the present invention is explained under the assumption that the present invention is applied to a NAN wireless communication system, by which the present invention may be non-limited. The present invention can be applied to various wireless systems using the same scheme.

What is claimed is:
1. A method of transmitting a service discovery frame (SDF) by a first neighbor awareness networking (NAN) device in a wireless communication system, the method comprising:

determining a service among a plurality of services which are supported by the first NAN device;

determining, based on the service, whether at least one of an authentication procedure and an association procedure is required by the service;

transmitting the SDF for the service, wherein the SDF includes first information to discover a second NAN device supporting the service, wherein the SDF further includes a first field for the authentication procedure and a second field for the association procedure when both the authentication procedure and the association procedure are required by the service, wherein the first field includes at least one of an attribute identifier (ID) field, a length field, a service ID field, and a device info field and the second field includes at least one of a channel information field, an offset field, a data duration field, and a period field, wherein the SDF further includes only the first field among the first field and the second field when only the authentication procedure is required by the service, and wherein the SDF further includes only the second field among the first field and the second field when only the association procedure is required by the service; and performing, based on the at least one of the authentication procedure and the association procedure, the service between the first NAN device and the second NAN device.

2. The method of claim 1, wherein the SDF is transmitted in a discovery window (DW).

3. The method of claim 2, wherein the second field includes second information on a plurality of data paths.

4. The method of claim 2, wherein a plurality of frames for the at least one of the authentication procedure and the association procedure is exchanged in a first data path among the plurality of data paths before data for the service is exchanged.

5. The method of claim 4, wherein the is an initial data path among the plurality of data paths.

6. The method of claim 4, wherein the first NAN device operates in a first mode and a second mode whether the authentication procedure is required by the service, wherein the first mode corresponds to a mode not requiring the authentication procedure, and wherein the second mode corresponds to a mode requiring the authentication in procedure.

7. The method of claim 6, further comprising: transmitting an authentication request frame containing a first value to the second NAN device when the first NAN device operates in the second mode; and receiving an authentication response frame containing a first function generated based on the first value and a second value, and the second value from the second NAN device.

8. The method of claim 7, wherein the authentication response frame further comprises ID information on the service.

9. The method of claim 7, further comprising:

generating a second function based on the first value and the second value after the authentication response frame is received; and transmitting an authentication confirmation frame to the second NAN device when the second function and the first function received from the authentication response frame are identical to each other.

10. The method of claim 9, wherein performing, based on the at least one of the authentication procedure and the association procedure, the service between the first NAN device and the second NAN device comprises:

exchanging data for the service after the authentication procedure is completed when the authentication confirmation frame is transmitted to the second NAN device, and performing, based on the data, the service between the first NAN device and the second NAN device.

11. The method of claim 1, wherein the service ID field includes third information on a service ID of the service, and wherein the service ID is configured by hash data generated based on at least one of a service name, a key, and a timestamp which are related to the service.

12. The method of claim 11, wherein a plurality of data frames for the service is exchanged with the second NAN devices and wherein the plurality of data frames are encrypted using the hash data.

13. The method of claim 12, wherein the plurality of data frames are encrypted using at least a portion of the hash data.

14. The method of claim 11, wherein the authentication procedure is performed based on key distribution, and wherein the key distribution is performed using the hash data.

15. A first neighbor awareness networking (NAN) device transmitting a service discovery frame (SDF) in a wireless communication system, comprising:

a receiver configured to receive information from an external device;

a transmitter configured to transmit information to an external device; and a processor operatively coupled to the receiver and the transmitter, wherein the processor is configured to:

determine a service among a plurality of services which are supported by the first NAN device;

determine, based on the service, whether at least one of an authentication procedure and an association procedure is required by the service;

transmit the SDF for the service, wherein the SDF includes first information to discover a second NAN device supporting the service, wherein the SDF further includes a first field for the authentication procedure and a second field for the association procedure when both the authentication procedure and the association procedure are required by the service, wherein the first field includes at least one of an attribute identifier (ID) field, a length field, a service ID field, and a device info field and the second field includes at least one of a channel information field, an offset field, a data duration field, and a period field, wherein the SDF further includes only the first field among the first field and the second field when only the authentication procedure is required by the service, and wherein the SDF further includes only the second field among the first field and the second field when only the association procedure is required by the service; and perform, based on the at least one of the authentication procedure and the association procedure, the service between the first NAN device and the second NAN device.

* * * * *